United States Patent [19]

Brown et al.

[11] Patent Number: 4,478,117
[45] Date of Patent: Oct. 23, 1984

[54] SLANT BED FOR CHUCKER MACHINE

[75] Inventors: Ivan R. Brown, Breesport; Terrence M. Sheehan, Elmira, both of N.Y.

[73] Assignee: Hardinge Brothers, Inc., Elmira, N.Y.

[21] Appl. No.: 375,488

[22] Filed: May 6, 1982

[51] Int. Cl.³ .............................................. B23B 17/00
[52] U.S. Cl. ................................................................ 82/32
[58] Field of Search .................... 82/32; 409/235, 337; 408/234

[56] References Cited

U.S. PATENT DOCUMENTS

| D. 192,263 | 2/1962 | Gerchow | 82/32 |
|---|---|---|---|
| 1,293,148 | 2/1919 | William | 82/32 |
| 1,333,043 | 3/1920 | Steinle et al. | 82/32 |
| 1,417,521 | 5/1922 | Haumann | 82/32 |
| 1,777,603 | 10/1930 | Cockburn et al. | 82/32 |
| 2,092,587 | 9/1937 | Olson | 82/32 |
| 2,159,247 | 5/1939 | Boom | 82/32 |
| 2,398,239 | 4/1946 | Melin | 408/234 |
| 2,554,102 | 5/1951 | Globash et al. | 82/32 |
| 2,621,552 | 12/1952 | Montanus et al. | 82/32 |
| 2,734,415 | 2/1956 | Mobius | 82/32 |
| 2,739,773 | 3/1956 | Rougemont | 82/32 |
| 2,789,480 | 4/1957 | Wellauer | 82/32 |
| 3,124,985 | 3/1964 | Curtis et al. | 82/32 |
| 3,307,438 | 3/1967 | Bottger et al. | 82/32 |
| 3,348,795 | 10/1967 | Schilling | 408/234 |
| 3,436,994 | 4/1969 | Diener | 408/234 |
| 3,534,643 | 10/1970 | Markgraf | 82/32 |
| 3,749,509 | 7/1973 | Lukoshnikov | 82/32 |
| 3,785,227 | 1/1974 | Wolff | 82/32 |
| 3,800,636 | 4/1974 | Zagar | 82/32 |
| 3,837,245 | 9/1974 | Schuler et al. | 408/234 |
| 4,040,316 | 8/1977 | Gramespacher et al. | 82/32 |
| 4,177,550 | 12/1979 | Sipek et al. | 82/32 |

FOREIGN PATENT DOCUMENTS

| 319585 | 4/1918 | Fed. Rep. of Germany | 82/32 |
|---|---|---|---|
| 644182 | 10/1937 | Fed. Rep. of Germany | 82/32 |
| 2802257 | 4/1979 | Fed. Rep. of Germany | 82/32 |
| 886133 | 6/1943 | France | 82/32 |
| 937700 | 5/1948 | France | 82/32 |
| 1200279 | 3/1959 | France | 82/32 |
| 413391 | 7/1946 | Italy | 82/32 |
| 45306 | 4/1981 | Japan | 82/32 |
| 531783 | 4/1941 | United Kingdom | 408/234 |
| 721637 | 7/1955 | United Kingdom | 82/32 |
| 791465 | 1/1980 | U.S.S.R. | 82/32 |
| 755451 | 8/1980 | U.S.S.R. | 82/32 |

OTHER PUBLICATIONS

"Mazak Slant Turn 15 Chucker & Universal" by Yamazaki Machinery Works, Ltd., Catalog #NST15 80 8 15000.

"Model SL-2 CNC Lathe" by Mori Seiki, Catalog #NCJ79.4.4.

"Mazak Quick Turn Chucker & Universal" by Yamazaki Machinery Works, Ltd., Catalog #QT 81.5.20000.

Primary Examiner—Leonidas Vlachos
Assistant Examiner—Jerry Kearns
Attorney, Agent, or Firm—Shlesinger Arkwright Garvey & Fado

[57] ABSTRACT

A bed for a machine tool comprising a bottom, sides, a front, a rear and top with the bottom having a three point suspension and the top having a substantial portion inclined at between 55° and 65° from the horizontal and including a pair of spaced cavities within the bed which are ribbed and provide dual torque tube reinforcement.

2 Claims, 11 Drawing Figures

SLANT BED FOR CHUCKER MACHINE

This invention relates to beds for machine tools and particularly to chuckers and bar machines.

HISTORICAL BACKGROUND

Slant beds for chucker and bar machines have been available for some time. The primary object of the slant bed is to provide a means for moving the chips away from the tooling during machining operation. The slant bed allows the chips to fall downwardly into some type of a receiver where they can be removed either automatically by a conveyor system or periodically by removing a receptacle which contains chips and dumping the receptacle or otherwise removing the chips which have been caught in the support bed of the machine.

Various beds have been made but they have structural limitations as to the angle of the bed and the bulk in order to give reasonably accurate control. If the angle is too steep, the distribution of weight becomes critical and there is a considerable cantilever affect which can cause inaccuracies in machining. If the angle is too flat, the operator will be further away from the work area and in some instances have difficulty in access because of the need to reach into certain areas of the machine housing. Also, if the angle is too flat, chips are unable to fall downward into the receptacle.

Accuracy has in the past been limited by slant bed designs because of torque and cantilever effect. To counteract distortion of the bed, complex beds had to be designed to make the machine tools comparable with the flat bed machine tools. Also, for the sake of rigidity, weight was increased. This resulted in additional cost for material and handling of same.

OBJECTS AND SUMMARY

It is an object of this invention to produce a slant bed for a slant bed machine which will give operators a closer access to their work area and excellent visual control of the machine. Yet another object of this invention is to provide a slant bed for machine tools which will enable easy access for fast loading and unloading of work pieces.

Yet a further object of this invention is to provide a slant bed for machine tools which has maximum structural rigidity thereby permitting maximum accuracy in machining operations.

Another object of this invention is to provide a heavy duty cast iron bed with ribbed construction and dual torque tube design for providing increased accuracy comparable to flat bed machine tools.

A further object of this invention is to provide a bed constructed from a cementicious material such as granite, concrete or the like.

A further object of this invention is to provide a bed with 3 point suspension at optimum location about the center of gravity to eliminate leveling problems.

Yet another object of this invention is to provide a bed which includes reinforced ribbing in the hollow of the bed for absorbing shock and reducing deflection due to torsional loading by a simple tubular design arrangements.

Yet another object of this invention is to provide a bed which will allow the machine tool to occupy a minimum amount of floor space.

Yet another object of this invention is to provide a slant bed which will permit accuracy in machining up to ten-millionths of an inch programmable resolution in conjunction with automatic numerical computer controls.

In summary, this invention relates to a slant bed for use in machine tools which is super-rigid under normal operating conditions of automatic machine equipment.

These and other object and advantages of this invention will appear from the following detailed description, taken in connection with the accompanying drawings, in which.

Figure 1:
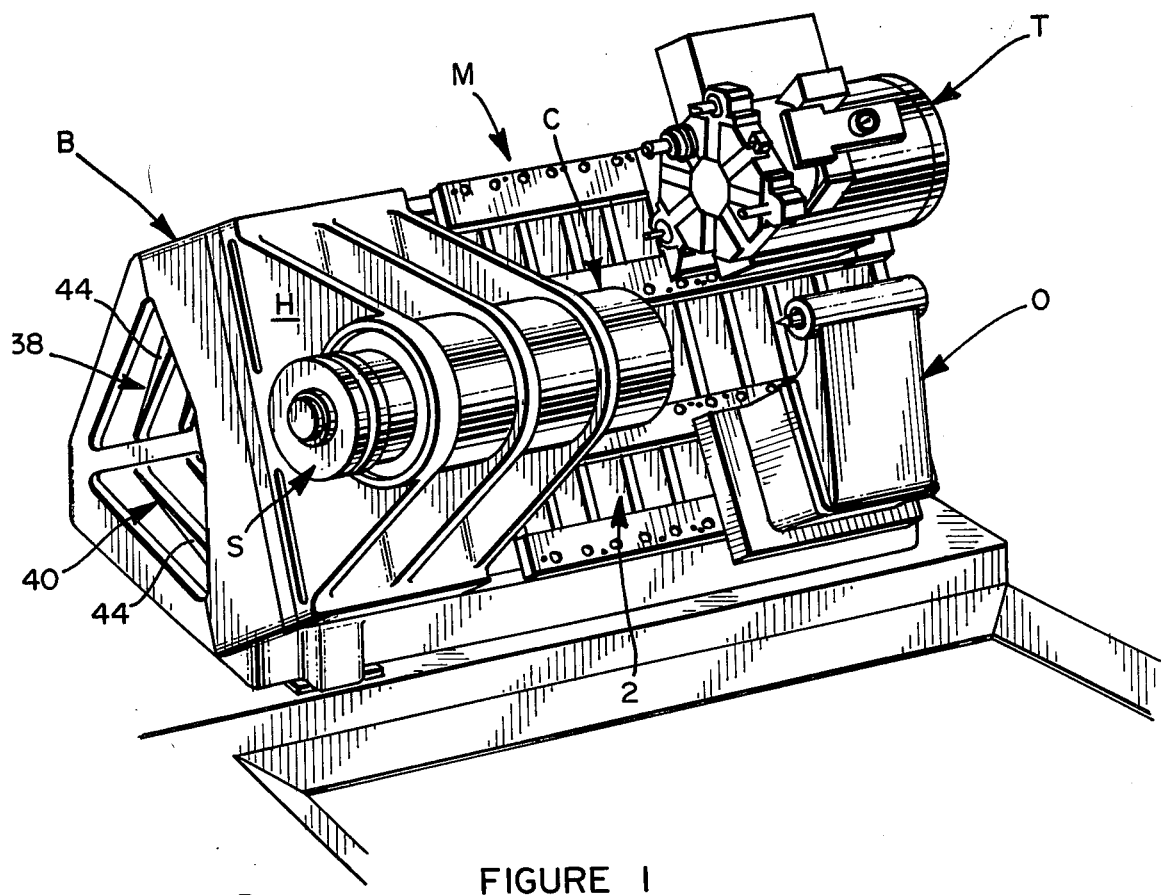
FIG. 1 is a perspective view showing a portion of the machine without housing and complete support base but with headstock and tailstock and an vertical turret in position.
Figure 1A:
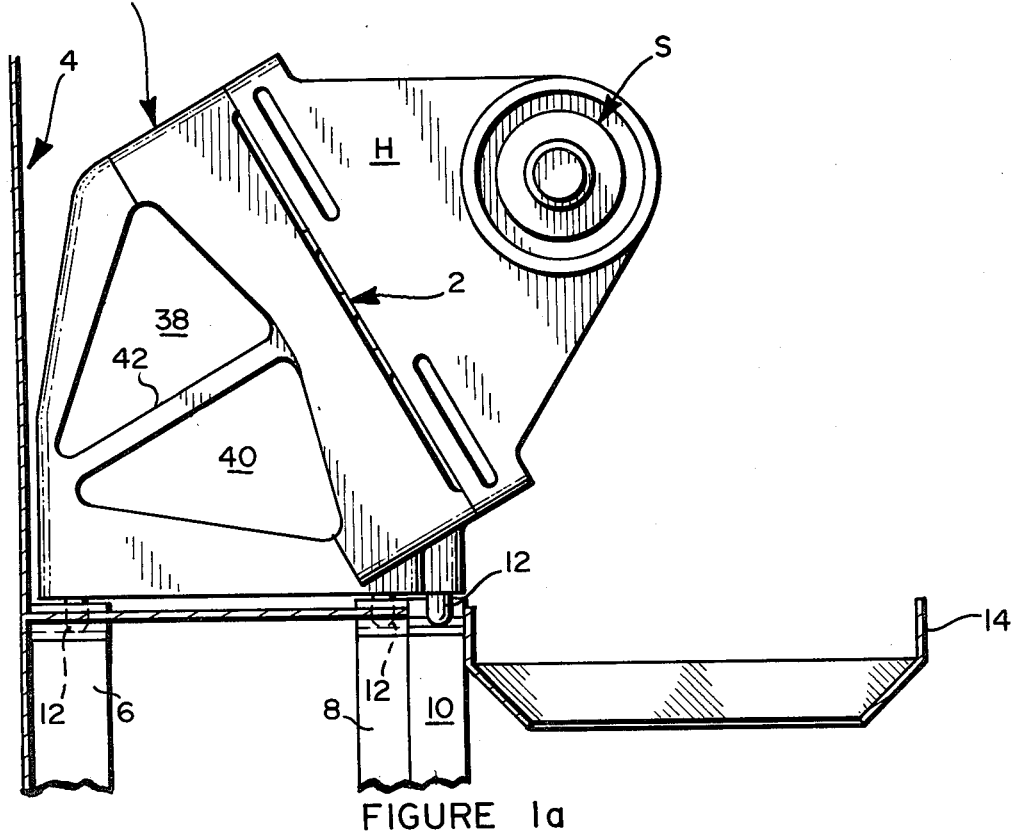
FIG. 1a is an end view of the bed showing headstock in place and the bed mounted on the support stand which is shown in cross-section with the upper portion of the chip receiving trough shown in cross-section.

FIGS. 1 AND 1a

In FIG. 1, the upper portion of the machine M includes the bed B on which is mounted a headstock H for support of a spindle S on which is mounted the power chuck C.

Mounted on the bed B is an end working programmable vertical turret T and a programmable tailstock O.

The bed B has its upper top surface 2 at an angle to the horizontal between 55° and 65° and preferably 60° for maximum advantage as herebefore mentioned. The housing 4 includes vee block foot supports 6, 8 and 10 for the 3 point suspension feet 12 on the bed B. The vee block foot supports 6, 8 and 10 accept dimensional variations due to thermal changes of deformation of the support structures, thus reducing internal stresses of the bed B. These vee block supports 6, 8 and 10 extend all the way to the floor and act as 3 point support for the entire machine M. It will be noted that the feet 12 are each offset from the longitudinal center axis L of the bed B different distances to afford maximum stability. Beneath the bed as seen in FIG. 1a, is a catch pan 14 for catching chips which will fall into a receptacle beneath the catch pan for removal by means not shown.

FIGS. 2 THROUGH 6

As best shown in FIG.'s 2 and 3, the bed B is provided with the top surface 2 on which are mounted two pairs of ways 16 and 18 and 20 and 22 respectively. 16 and 18 are the upper ways and 20 and 22 are the lower ways. The upper ways can include a vertical turret having X and Z axes (not shown) or an end turret T. The lower ways 20 and 22 include a tailstock O as best shown in FIG. 1 or an end working turret having Z axis (not shown). It is therefore possible with the bed 2 to have a 2, 3, or 4 axes chucker.

Figure 2:
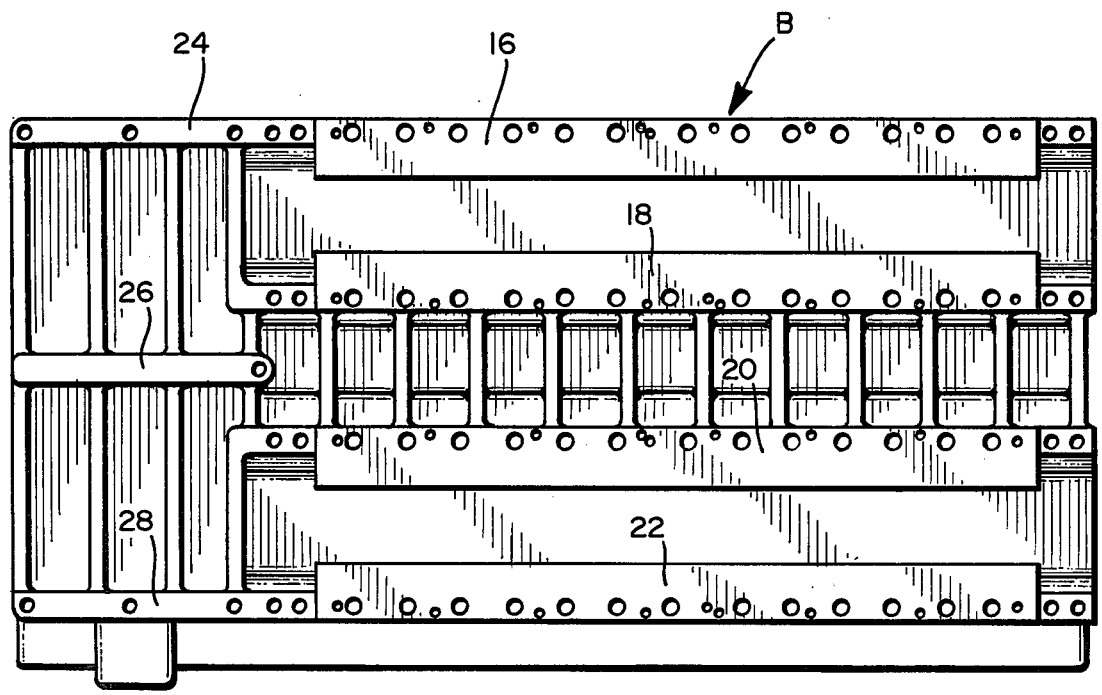
FIG. 2 is a top plan view of the cast iron bed.
Figure 3:
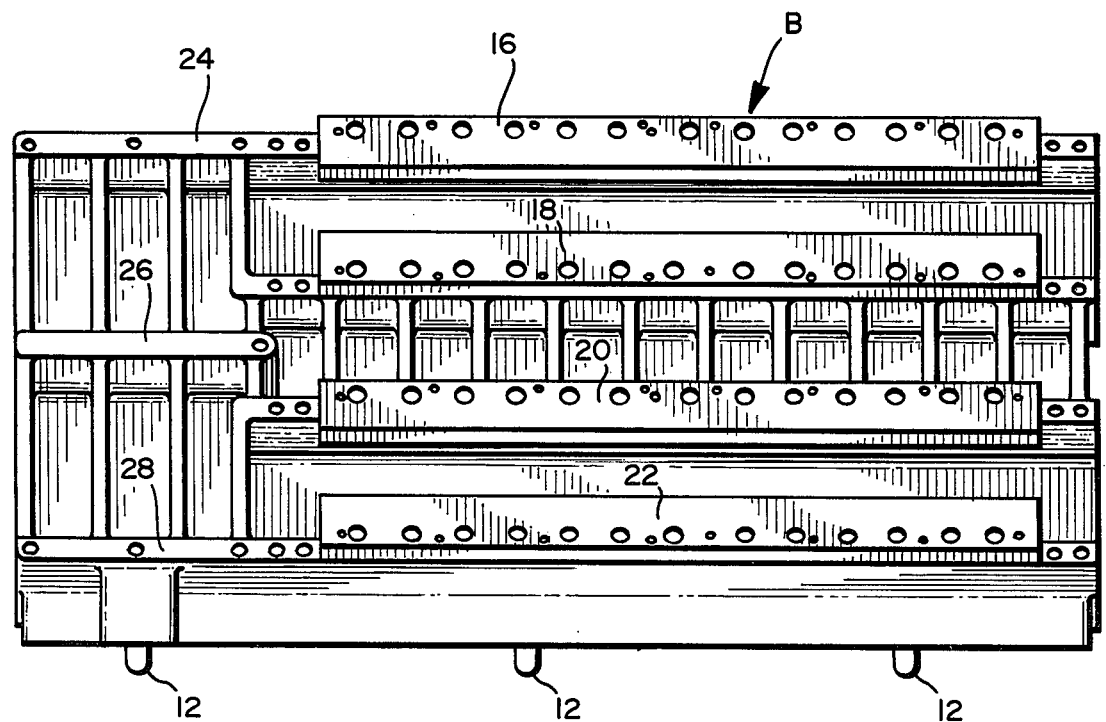
FIG. 3 is a front elevational view of the cast iron bed.

The bed B at the left side of drawings FIGS. 2 and 3 includes support ribbing 24, 26, and 28 for the headstock H. The headstock H is bolted or otherwise secured to the bed B.

Figure 4:
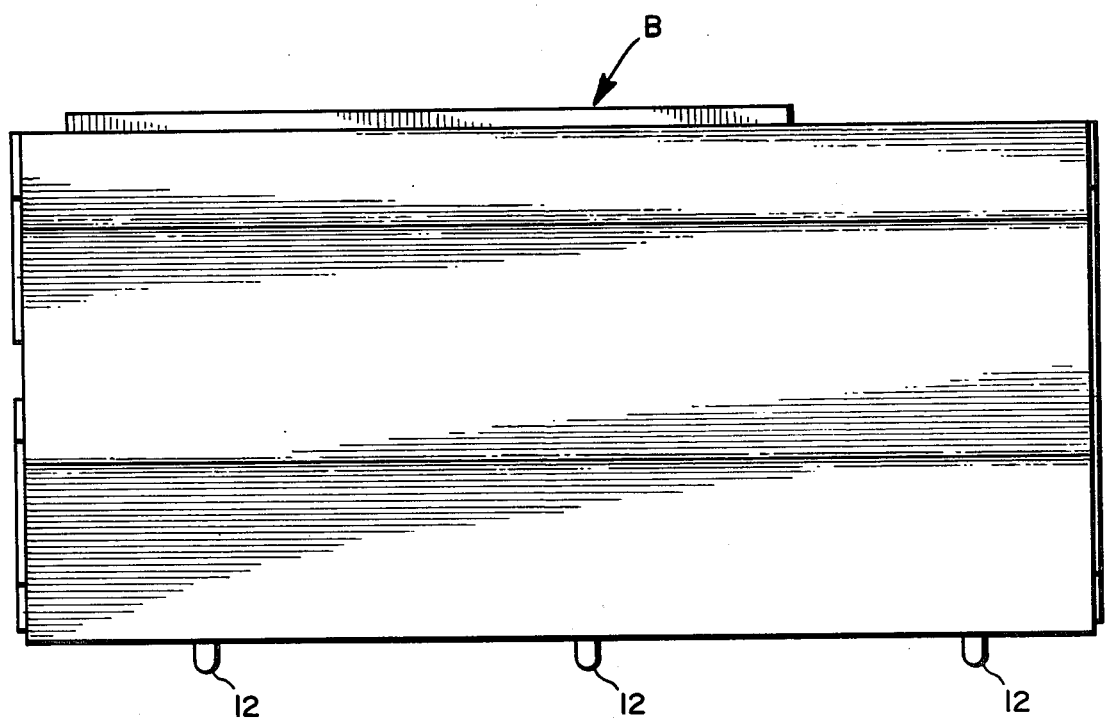
FIG. 4 is a rear view of the cast iron bed.
Figure 5:
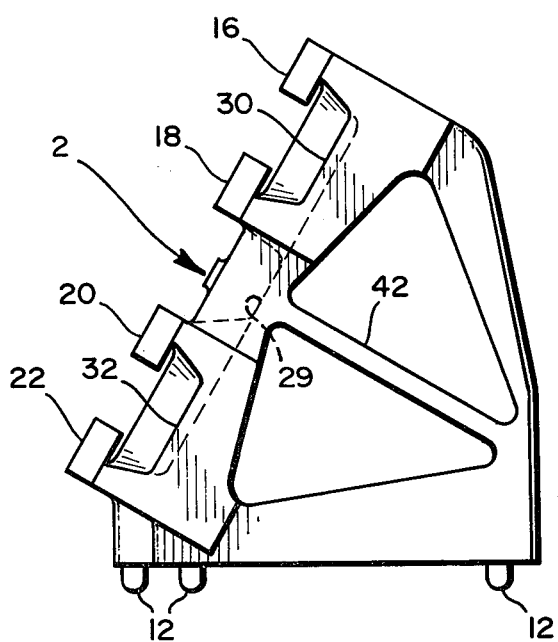
FIG. 5 is a right side elevation view of the bed shown in FIG. 3.
Figure 6:
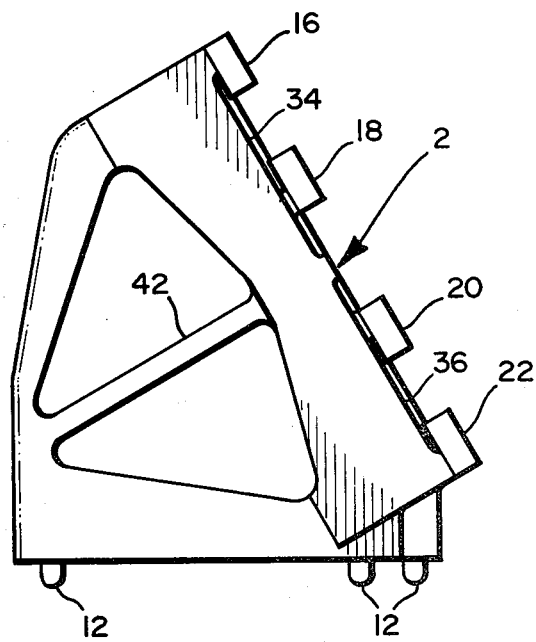
FIG. 6 is a left side elevation view of the bed shown in FIG. 3.
Figure 7:
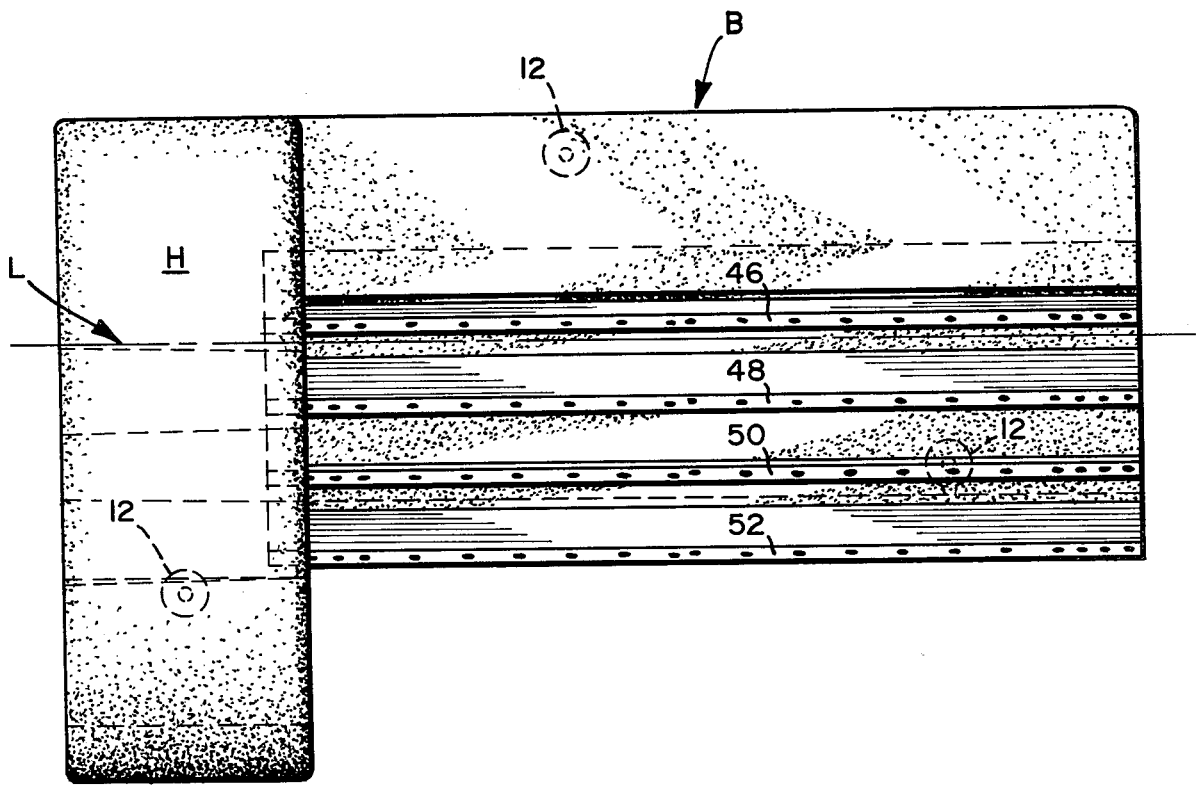
FIG. 7 is a top plan view of a modified version of the bed made from cementicious material.
Figure 8:
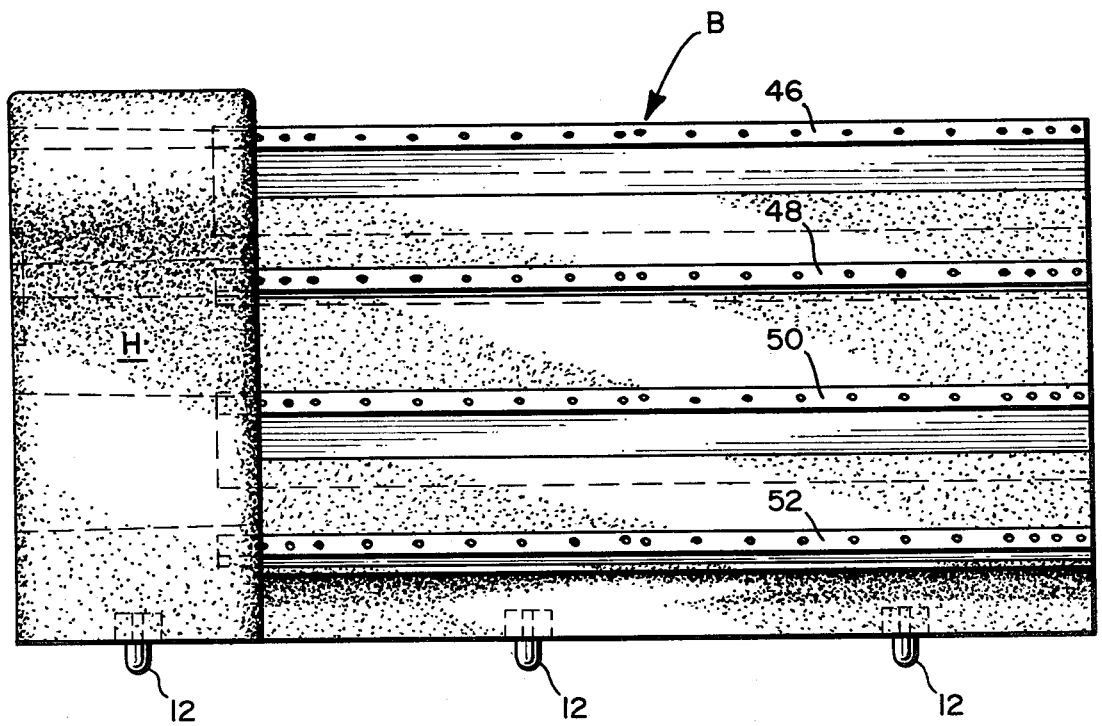
FIG. 8 is a front elevational view of the bed of FIG. 7.
Figure 9:
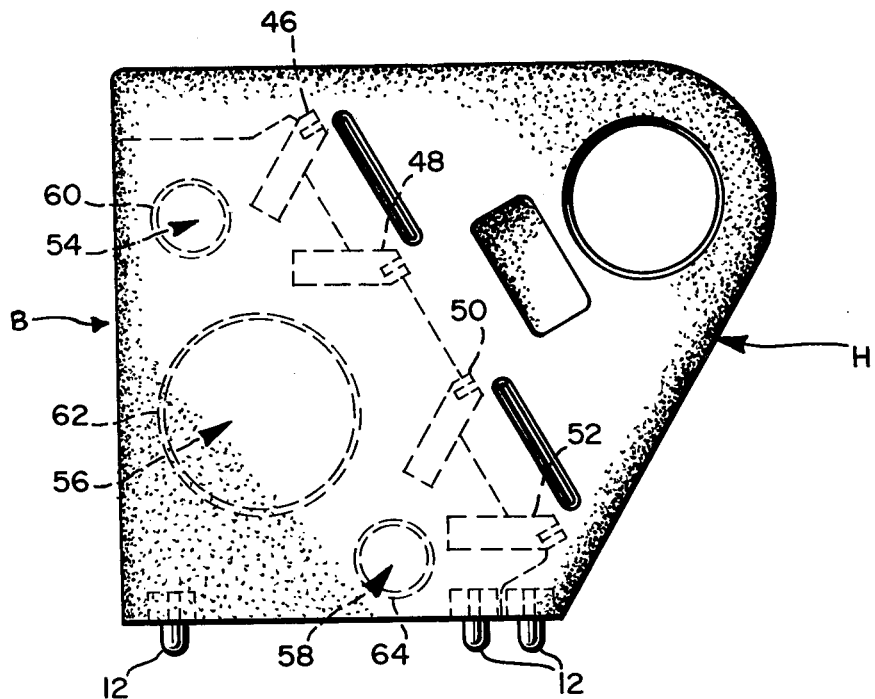
FIG. 9 is a left side elevational view of the bed of FIG. 7.
Figure 10:
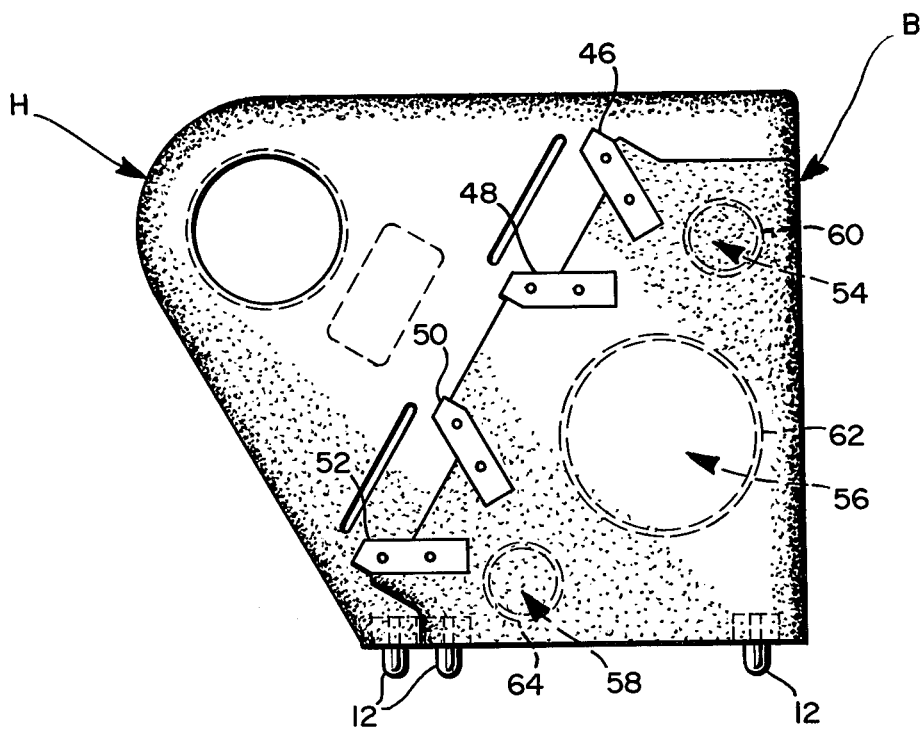
FIG. 10 is a right side elevational view of the bed of FIG. 7.

The rear of the bed is smooth and unbroken as best shown in FIG. 4.

Oil drainage troughs 29, 30, 32, 34, and 36 as best shown in FIG.'s 5 and 6, are provided with sloping side walls to allow oil accumulating beneath the beds to drain off out the ends of the bed B without stagnating and becoming rancid. 29 drains into 32.

The bed B is cast in one piece and is provided with a hollow central area comprised of two triangular shaped torque tubes 38 and 40 extending from one end of the bed B to the other and opening at either end. Separating the torque tubes 38 and 40 is a central web 42.

As best shown in FIG. 1, the torque tubes 38 and 40 are provided with structural reinforcing ribs 44 which extend from one end of the tubes to the other end. These reinforcing ribs 44 provide anti-torque features thereby maintaining the bed in ridged position during all phases of machining operation.

FIGS. 7, 8, 9, AND 10

In FIG.'s 7, 8, 9, and 10, the bed B is cast in one piece of cementicious material and includes the headstock H. The bed B includes the upper ways 46 and 48 and the lower ways 50 and 52 which are bolted to cast iron strips imbedded into the cementicious material. The bed B of FIG.'s 7, 8, 9, and 10 includes hollow areas 54, 56, and 58 in order to reduce weight of the bed B. The hollows 54, 56, and 58 are formed by steel tubes or the like 60, 62, and 64 which run from one end of the bed B to the other end and are capped at the end rims during forming steps.

It is to be noted that the torque tube or cylinder 62 is larger than the torque tubes or cylinders 60 and 64.

Relative to the type of cementicious material which is used in the construction of the bed B, it should be noted that certain plastic compositions incorporating granite or other types of crushed stone or steel reinforcing fibers or the like may be used where the material will not disintegrate or fracture or otherwise crack from vibrations and torque over long periods of time.

While this invention has been described as having a preferred design, it will be understood that it is capable of further modification. This application is, therefore, intended to cover any variations, uses, or adaptations of the invention following the general principles thereof and including such departures from the present disclosure as come within known or customary practice in the art to which this invention pertains, and as may be applied to the essential features hereinbefore set forth and fall within the scope of this invention or the limits of the claims.

We claim:

1. A bed for a machine tool having a tool element engagable with a workpiece, comprising:
  (a) said bed formed of cementitious material and including a way portion and a headstock portion integral therewith;
  (b) said way portion including a front, a rear, a bottom and a top;
  (c) said headstock portion including a front, a rear, a bottom and a top;
  (d) said way portion bottom having front and rear edges;
  (e) said headstock portion bottom having front and rear edges;
  (f) said way portion bottom having a longitudinal center axis substantially equidistant from said way portion bottom front and rear edges;
  (g) three point suspension means projecting from said bed;
  (h) two of said three point suspension means being positioned on said way portion bottom, one of said two adjacent said way portion bottom front edge and the other one of said two adjacent said way portion bottom rear edge;
  (i) the other one of said three point suspension means being positioned on said headstock portion bottom adjacent said front edge thereof;
  (j) said other one of said two of said three point suspension means is adjacent said way portion bottom rear edge intermediate the other two of said three point suspension means;
  (k) said three point suspension means are equally spaced longitudinally of said way portion longitudinal center axis;
  (l) a substantial portion of said way portion being inclined at between 55° degrees and 65° degrees to the horizontal;
  (m) each of said three point suspension means is positioned a different distance from said longitudinal center axis whereby said one suspension means positioned on said headstock portion bottom is furthest from said longitudinal center axis and said one of said two of said three point suspension means adjacent said way portion bottom front edge is closest to said longitudinal center axis;
  (n) said way portion includes means imbedded in said bed way portion for mounting a plurality of pairs of cooperating ways including a first pair of cooperating ways mounted above a second pair of cooperating ways;
  (o) said bed including three cylindrical torque tubes extending the length of said bed imbedded in said cementitious material; and
  (p) said cylindrical torque tubes including one larger than the others.

2. A bed for machine tool as in claim 1 and wherein:
  (a) said rear of said way and headstock portions having a surface perpendicular to the plane of said bottom.

* * * * *